Dec. 4, 1934.    W. C. NEIN ET AL    1,982,826
SELF STARTING SYNCHRONOUS MOTOR
Filed Feb. 12, 1929

INVENTORS
William C. Nein
Thomas W. Valley

Patented Dec. 4, 1934

1,982,826

UNITED STATES PATENT OFFICE 1,982,826

SELF-STARTING SYNCHRONOUS MOTOR

William C. Nein and Thomas W. Varley,
New York, N. Y.

Application February 12, 1929, Serial No. 339,342

7 Claims. (Cl. 172—278)

This invention relates to alternating current motors to be used for timing devices, particularly where many devices are to operate at the same relative time and not actual time. The motor is to run in synchronism with a source of energy common to many motors and while the frequency of the source may vary, all motors connected to use that frequency will have the same relative speeds.

The motor is of the self-starting synchronous type and involves operation as an induction motor. This type of motor starts surely and has a torque curve falling in value as the speed increases. This simple type of motor varies in speed as the applied energy varies and as the load varies. On this account it is not a synchronous motor, the word synchronous meaning a fixed speed relative to the frequency of the applied energy. If the armature of the motor is so shaped as to vary the torque of the motor depending upon the position of the armature relative to the place of applied energy the torque of the motor will vary. Advantage is taken of this characteristic to cause the armature to hold a fixed speed relative to the frequency of the applied energy i. e. to operate synchronously. The method used to cause torque variation will be described for a disc armature and single pole field where the single pole is energized by the alternating current source and a shading coil is used to give a shifting field.

Figure 1:
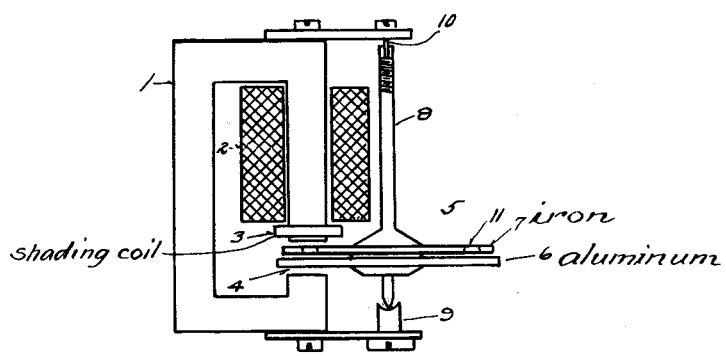
Figure 1 is a view showing the disc armature in relation to the driving magnet.
Figure 2:
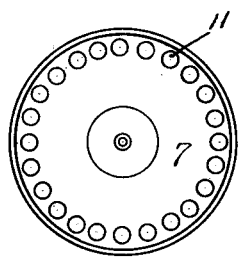
Figure 2 shows the disc armature.

Referring to Figures 1 and 2 the driving magnet core 1, has an energizing coil 2, and a shading coil 3. In the air gap 4, of the core 1, is an armature 5, consisting of two elements. The first element is an aluminum disc 6, and the second element is an iron disc 7. Both discs are supported by shaft 8, the shaft in turn being supported by bearing 9, and guide 10. Disc 7 has holes 11 spaced uniformly as shown.

The operation of the motor is as follows: Coil 2 is energized by the alternating current applied to it giving a flux to the air gap 4 and the discs 6 and 7 of the armature 5. This flux is alternating due to the source. Also the flux through the shading coil 3 is of less value and later in time than the flux through the part not shaded. These conditions set up a torque in the disc 6 in a well known manner. The torque is intermittent. The value of the torque also varies as the holes 11 in disc 7 change their position in the air gap 4. At standstill the torque of disc 6 is high enough to turn the armature 5 independently of the holes 11 in disc 7. As the armature 5 rotates due to torque the load applied to the armature tends to stop rotation. Due to rotation the armature torque falls. When the average torque equals the load applied the armature speed remains at that speed giving such conditions. The load is constant, the torque is intermittent and the inertia due to speed fills in the gap to give the average constant torque. The average torque varying also due to holes 11 in disc 7, gives a locking effect when the number of holes, in this case 24 holes, matches the intermittent torque impulses at 300 R. P. M. of the armature 5. The armature tends to hold a constant or synchronous speed of 300 R. P. M. for an applied energy at 60 cycles.

What is claimed as new and patentable is:

1. In a self-starting synchronous motor, the combination with a stationary magnetic member having an air gap, of a rotor comprising a rotatable shaft and a plurality of disks thereon, said disks entering within said air gap, one of said disks being of magnetic material and the other of said disks being of electrically conductive non-magnetic material and means for producing out of phase fluxes in said air gap and affecting said disks, said disk of magnetic material having recesses formed therein within said air gap said disk of magnetic material lying wholly outside said disk of non-magnetic material.

2. In a self-starting synchronous motor, the combination with a stationary magnetic member having an air gap, of a rotor comprising a rotatable shaft and a plurality of disks thereon, said disks entering within said air gap, one of said disks being of magnetic material, and the other of said disks being of electrically conductive non-magnetic material, and means for producing out of phase fluxes, said disk of non-magnetic material being substantially continuous within said air gap, and said disk of magnetic material having recesses within said air gap.

3. In a self-starting synchronous motor, the combination with a stationary magnetic member having an air gap, of a rotor comprising a rotatable shaft and a plurality of disks thereon, said disks entering within said air gap, said disks being of electrically conductive material and one of said disks being of magnetic material and means for producing out of phase fluxes, said disk of magnetic material having recesses within said air gap and lying wholly outside the other of said disks.

4. In a self-starting synchronous motor, the combination with a stationary magnetic member having an air gap, of a rotor comprising a rotatable shaft and a plurality of disks thereon, said disks entering within said air gap and being of electrically conductive material, one of said disks being of magnetic material, and means for producing out of phase fluxes, the said disk of magnetic material having recesses within said air gap, the other of said disks being substantially continuous within said air gap.

5. An alternating current motor having an armature comprising a plurality of disks, certain of said disks being of electrically conductive non-magnetic material and a disk of magnetic material having recesses therein and lying wholly outside the other of said disks.

6. An alternating current motor having an armature comprising a plurality of disks, certain of said disks being of electrically conductive non-magnetic material and a disk of magnetic material having perforations therein.

7. An alternating current motor having an armature comprising an aluminum disk and an iron disk having perforations.

WILLIAM C. NEIN.
THOMAS W. VARLEY.